US008693390B2

(12) United States Patent
Hirai et al.

(10) Patent No.: US 8,693,390 B2
(45) Date of Patent: Apr. 8, 2014

(54) MOBILE TELEPHONE, TRANSMISSION POWER CONTROL METHOD, AND RECORDING MEDIUM

(75) Inventors: Yuu Hirai, Kyoto (JP); Mitsufumi Yoshimoto, Kyoto (JP)

(73) Assignee: Kyocera Corporation, Kyoto (JP)

( * ) Notice: Subject to any disclaimer, the term of this patent is extended or adjusted under 35 U.S.C. 154(b) by 57 days.

(21) Appl. No.: 13/557,574

(22) Filed: Jul. 25, 2012

(65) Prior Publication Data

US 2013/0028168 A1   Jan. 31, 2013

(30) Foreign Application Priority Data

Jul. 27, 2011 (JP) ................................ 2011-164175
Jul. 2, 2012 (JP) ................................ 2012-148142

(51) Int. Cl.
*H04B 7/185* (2006.01)
*H04W 52/04* (2009.01)
*H04B 7/26* (2006.01)

(52) U.S. Cl.
CPC ............. *H04W 52/04* (2013.01); *H04B 7/2628* (2013.01); *H04B 7/2606* (2013.01)
USPC ........... 370/318; 370/315; 370/335; 370/492; 455/11.1; 375/211

(58) Field of Classification Search
None
See application file for complete search history.

(56) References Cited

U.S. PATENT DOCUMENTS

| | | | |
|---|---|---|---|
| 8,005,051 B2 * | 8/2011 | Watanabe | 370/335 |
| 8,358,615 B2 * | 1/2013 | Ali et al. | 370/328 |
| 2011/0222469 A1 * | 9/2011 | Ali et al. | 370/328 |

FOREIGN PATENT DOCUMENTS

JP    2007-067512 A    3/2007

OTHER PUBLICATIONS

LG Electronics USA, "SAR Compliance Evaluation Report", Dec. 27, 2010, p. 18.
Motorola Mobility, Inc., "Portable Cellular Phone SAR Test Report", May 19, 2011, p. 5.
Pantech Co., Ltd., "SAR Test Report", May 22, 2011, p. 35.
Sony Ericsson Mobile Communications AB, "SAR Compliance Evaluation Report", Jan. 4, 2011, p. 20.
Sony Ericsson Mobile Communications AB, "Test Report issued by Accredited SAR Laboratory", Feb. 25, 2011, p. 20.
"Transistor Technology Special No. 47", CQ Publishing, Sep. 1994, pp. 77-79.

* cited by examiner

*Primary Examiner* — Duc C Ho
(74) *Attorney, Agent, or Firm* — Procopio, Cory, Hargreaves & Savitch LLP

(57) ABSTRACT

A mobile telephone having a relaying function, the relaying function being a function of wirelessly connecting to an external device and a base station and of relaying data between the external device and the base station, the mobile telephone comprising: a first wireless communication unit configured to perform wireless communication with the external device; and a second wireless communication unit configured to perform wireless communication with the base station, wherein during a relay period for relaying data between the external device and the base station, transmission power of the second wireless communication unit is controlled within a limit of a second maximum power that is smaller than a first maximum power, and when voice communication is started in a course of the control using the second maximum power, the transmission power is controlled within a limit of the first maximum power.

6 Claims, 6 Drawing Sheets

MOBILE TELEPHONE, TRANSMISSION POWER CONTROL METHOD, AND RECORDING MEDIUM

CROSS-REFERENCE TO RELATED APPLICATION

This application is based on applications No. 2011-164175 and No. 2012-148142 filed in Japan, the content of which is hereby incorporated by reference.

TECHNICAL FIELD

The present invention relates to a mobile telephone having a function of relaying data between an external device and a base station, and in particular to technology of controlling transmission power.

BACKGROUND ART

For devices that emit radio waves, acceptable limits of radio waves are defined in consideration of the effects of radio waves on the human body.

As a criterion for determining the limits, specific absorption rate (SAR) is used. SAR indicates an amount of energy absorbed per unit mass of tissue per unit time, and is expressed in units of W/kg. A greater SAR value indicates greater effects on the human body.

For example, in the United States, the upper limit of the energy amount absorbed by any 1 gram of human tissue in six minutes is 1.6 W/kg. Among devices that emit radio waves, particularly wireless routers are subject to stricter standards for SAR measurement than mobile telephones and the likes. For example, SAR measurement locations for wireless routers are defined to be closer to the subject devices than the case of usual mobile telephones.

Hence, even in the case of mobile telephones, when they have a function of wirelessly connecting to an external device and a base station and relaying data between the external device and the base station, such mobile telephones, particularly while relaying data, are required to meet the condition that the SAR value measured at a closer location is at or below the aforementioned limit.

In Japan, devices that emit radio waves need to be designed to meet the condition that the upper limit of the energy amount absorbed by any 10 grams of human tissue in six minutes is 2.0 W/kg.

Here, since a SAR value increases with increased transmission power, it is possible that mobile telephones having the relaying function are given a lower upper limit of transmission power than usual mobile telephones.

As technology of lowering the maximum value of transmission power, technology disclosed in Non-Patent Literature 6 is well known, for example. As general technology of lowering the SAR value, technology disclosed in Patent Literature 1 is well known, for example.

CITATION LIST

Patent Literature

[Patent Literature 1] Japanese Patent Application Publication No. 2007-67512

Non-Patent Literature

[Non-Patent Literature 1] LG Electronics USA, "SAR COMPLIANCE EVALUATION REPORT", published on Dec. 27, 2010, p. 18

[Non-Patent Literature 2] Motorola Mobility Inc., "Portable Cellular Phone SAR Test Report", published on May 19, 2011, p. 5

[Non-Patent Literature 3] Pantech Co., Ltd., "SAR Test Report", published on May 22, 2011, p 35

[Non-Patent Literature 4] SONY Ericsson Mobile Communications AB, "SAR COMPLIANCE EVALUATION REPORT", published on Jan. 4, 2011, p. 20

[Non-Patent Literature 5] SONY Ericsson Mobile Communications AB, "Test Report issued by Accredited SAR Laboratory", published on Feb. 25, 2011, p. 15-p. 16

[Non-Patent Literature 6] "Transistor Technology Special No. 47", CQ publishing, September, 1994, p. 77-p. 79

SUMMARY OF INVENTION

Technical Problem

However, a lowered upper limit of transmission power increases the risk of interruption of communication and total disconnection depending on the communication environment.

The present invention is made in view of the problems above. The present invention relates to a mobile telephone that has a function of relaying data between an external device and a base station, and aims to provide a mobile telephone that meets a given SAR limitation while minimizing the risk of disconnections in periods other than a period in which the mobile telephone relays data between the external device and the base station.

Solution to Problem

To solve the problem above, one aspect of the present invention provides a mobile telephone having a relaying function, the relaying function being a function of wirelessly connecting to an external device and a base station and of relaying data between the external device and the base station, the mobile telephone comprising: a first wireless communication unit configured to perform wireless communication with the external device; a second wireless communication unit configured to perform wireless communication with the base station; and a transmission power controller configured to control transmission power of the second wireless communication unit according to a communication environment within a limit of a first maximum power, wherein the transmission power controller controls the transmission power of the second wireless communication unit within a limit of a second maximum power during a relay period, the relay period being a period in which the mobile telephone relays data between the external device and the base station, the second maximum power being smaller than the first maximum power, and controls the transmission power of the second wireless communication unit within the limit of the first maximum power when voice communication is started in a course of the control using the second maximum power, the first maximum power is defined so that a specific absorption rate (SAR) value measured at a first location is at or below a predetermined limit when the second wireless communication unit transmits data at the first maximum power, and the second maximum power is defined so that a SAR value measured at a second location is at or below the predetermined limit when the second wireless communication unit transmits data at the second maximum power, the second location being closer to the mobile telephone than the first location.

Advantageous Effects of Invention

The mobile telephone with the stated structure satisfies a given SAR limitation while minimizing the risk of disconnections in periods other than a period in which the mobile telephone relays data between the external device and the base station.

DESCRIPTION OF EMBODIMENTS

The following describes an embodiment of a mobile telephone pertaining to the present invention.

EMBODIMENT

1. System Configuration

Figure 1:
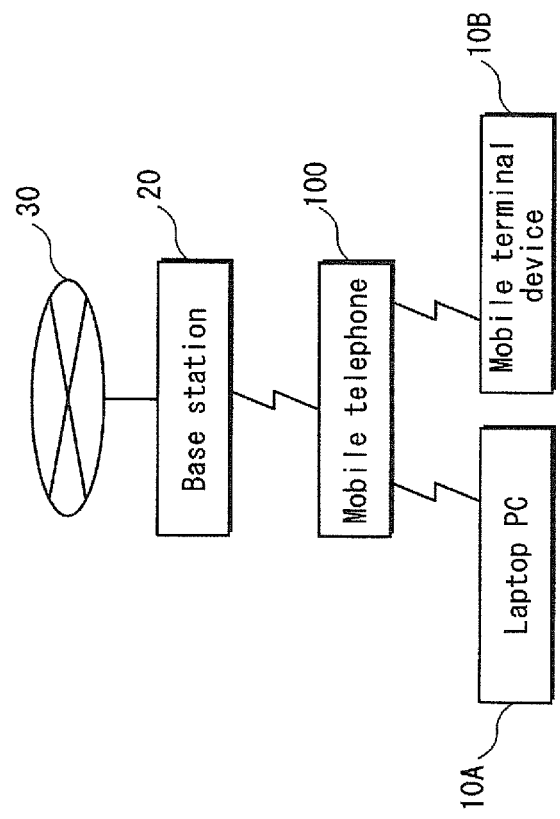
FIG. 1 shows a system configuration of a data relay system including a mobile telephone 100 pertaining to Embodiment.

FIG. 1 shows a system configuration of a data relay system including a mobile telephone 100 pertaining to Embodiment.

The data relay system includes: a laptop personal computer (PC) 10A and a mobile terminal device 10B which are examples representing external devices; and a base station 20 which connects to a network 30, as well as the mobile telephone 100 pertaining to Embodiment.

Besides common functions of mobile telephones such as a voice call function and a function of sending and receiving mails, the mobile telephone 100 has a relaying function of relaying data between the external devices (10A and 10B) and the base station 20. The "relaying function" is, in other words, a function of wireless routers, and is also referred to as "tethering function".

In the following description of Embodiment, it is assumed that the mobile telephone 100 cannot simultaneously perform the functions of common mobile telephones and the function of wireless routers.

As will be described later, the mobile telephone 100 includes: a first wireless communication unit 110 which performs wireless communication with the laptop PC 10A and/or the mobile terminal device 10B according to wireless Local Area Network (LAN) standards; and a second wireless communication unit 120 which performs wireless communication with the base station 20 according to code division multiple access (CDMA).

In the following description of Embodiment, it is assumed that the second wireless communication unit 120 is capable of performing communications using the personal communication service (PCS) band and the Cellular band.

Standards defining limits of radio waves acceptable for the human body vary country to country. In the United States in particular, wireless routers are subject to stricter standards than common mobile telephones.

A common mobile telephone is required to meet the condition that, with respect to each of the front face and the rear face of its body (shaped like a rectangular parallelepiped), the SAR value measured at a location 15 mm away from the surface of each face is at or below a given reference value (1.6 W/kg). In the following description, the condition applied to common mobile telephones is referred to as "the 15 mm condition".

A wireless router is required to meet the condition that, with respect to each of the six faces constituting its body (shaped like a rectangular parallelepiped) except faces away from the antenna by 15 mm or more, the SAR value measured at a location 10 mm away from the surface of each face is at or below a given reference value (1.6 W/kg). In the following description, the condition applied to wireless routers is referred to as "the 10 mm condition".

The 10 mm condition is applied to the mobile telephone 100 with respect to a period in which the mobile telephone 100 relays data between one of the external devices (10A or 10B) and the base station 20. This period is hereinafter referred to as "relay period".

Hence, in the relay period, the mobile telephone 100 controls the upper limit of the transmission power of the second wireless communication unit 120 to be the maximum power that has been defined to meet the 10 mm condition. This maximum power is hereinafter referred to as "the second maximum power". How to determine whether the current period is the relay period or not will be described later.

When the mobile telephone 100 starts voice communication in the course of controlling the upper limit of the transmission power of the second wireless communication unit 120 to be the second maximum power, the mobile telephone 100 controls the upper limit to be the maximum power that has been defined to meet the 15 mm condition, because the mobile telephone 100 does not function as a wireless router during voice communication. This maximum power is hereinafter referred to as "the first maximum power".

With this control, the mobile telephone 100 meets the 10 mm condition during the period in which the mobile telephone 100 functions as a wireless router, while minimizing the risk of disconnections during a period in which the mobile telephone 100 functions as a common mobile telephone.

2. Device Configuration

First, the following describes a device configuration of the mobile telephone 100 pertaining to Embodiment.

Figure 2A:
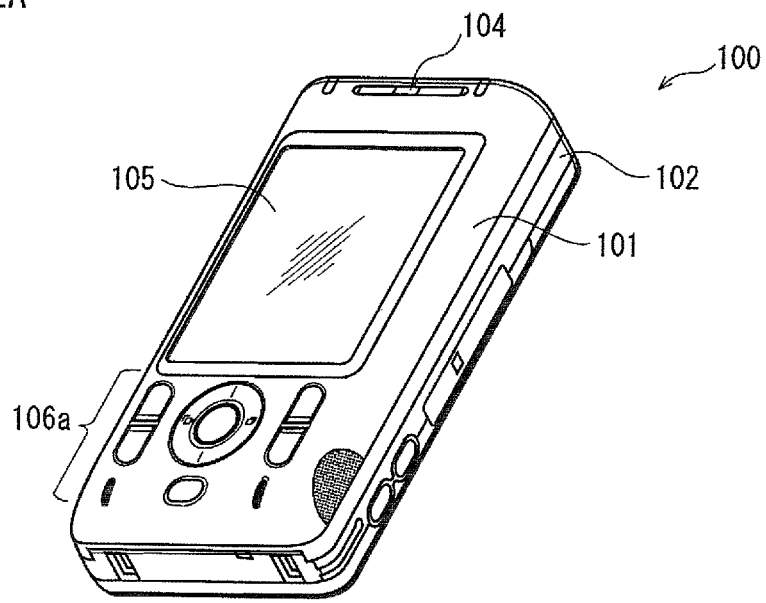
FIGS. 2A and 2B show external views of the mobile telephone 100 in the closed state and the open state, respectively.
Figure 2B:
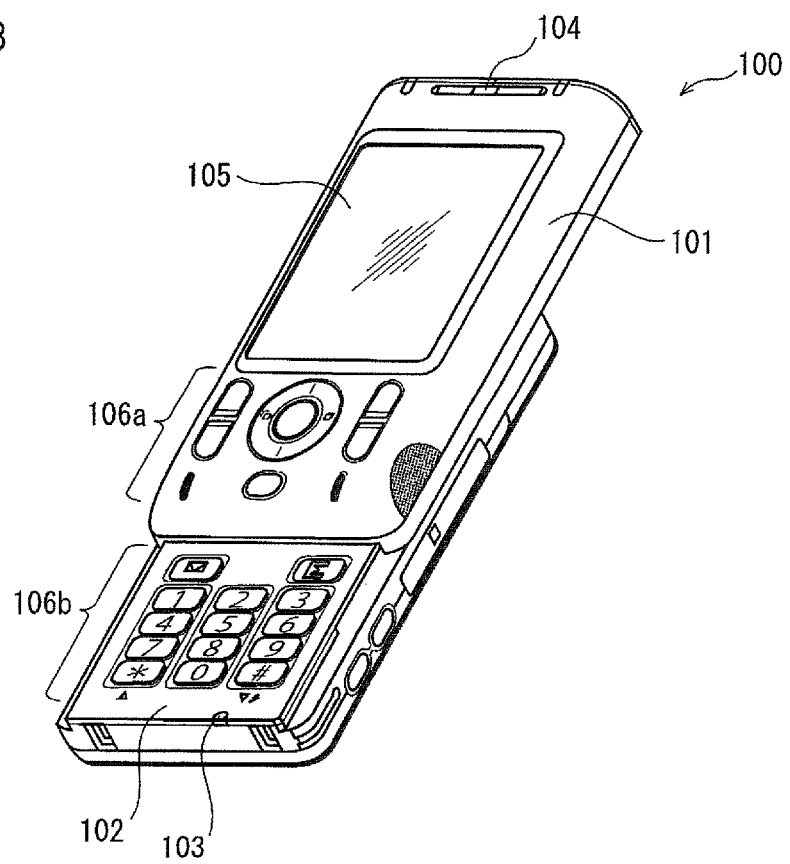

FIG. 2A is a perspective view of the mobile telephone 100 in the closed state, and FIG. 2B is a perspective view of the mobile telephone 100 in the open state.

As shown in FIG. 2A and FIG. 2B, the mobile telephone 100 is a so-called slider phone, including a first body 101 and a second body 102.

The first body 101 has a receiver 104, a display 105 and a first key set 106a. The second body 102 has a microphone 103 and a second key set 106b.

3. Functional Configuration

Figure 3:
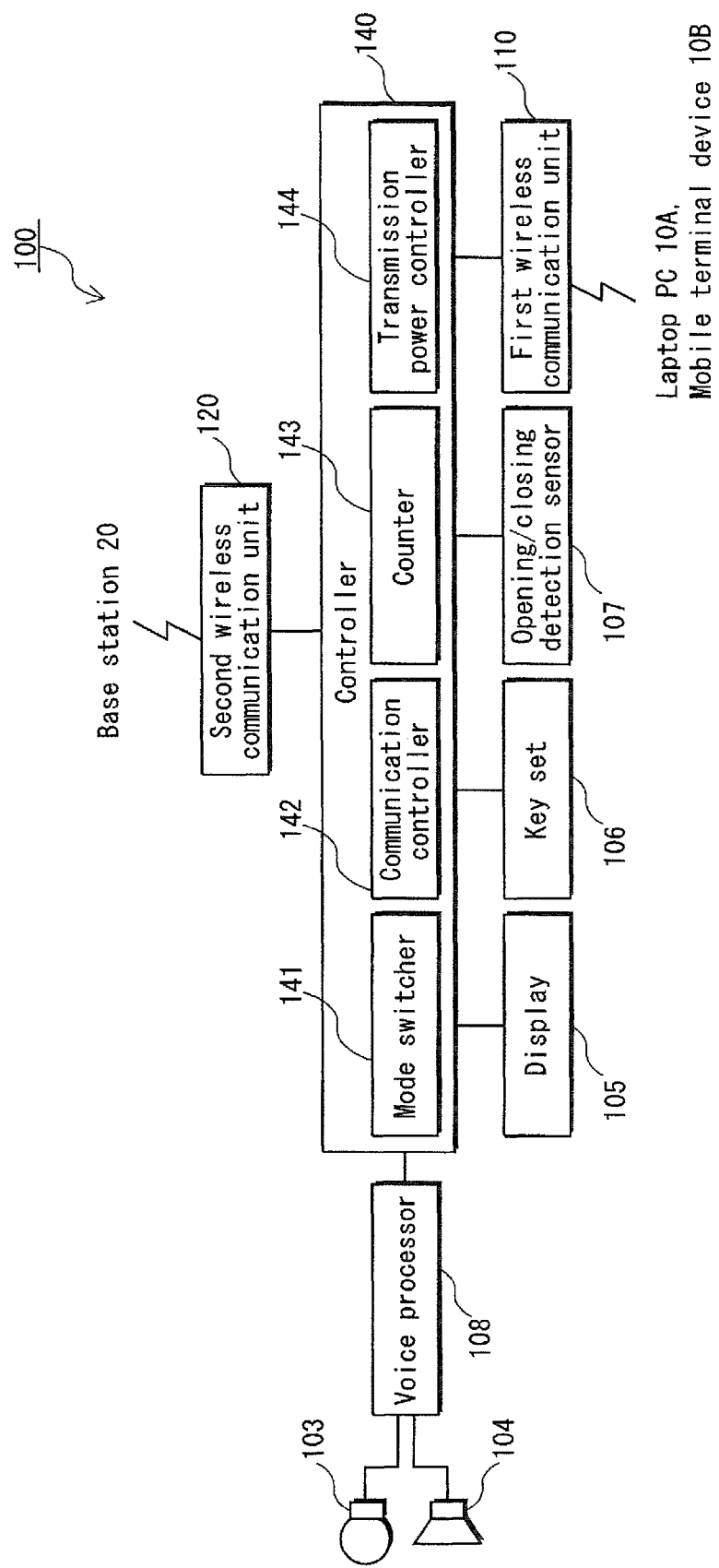
FIG. 3 is a block diagram showing principal functional components of the mobile telephone 100.

FIG. 3 is a block diagram showing principal functional components of the mobile telephone 100 pertaining to Embodiment.

As shown in the drawing, the mobile telephone 100 includes the microphone 103, the receiver 104, the display 105, a key set 106, an opening/closing detection sensor 107, a voice processor 108, the first wireless communication unit 110, the second wireless communication unit 120, and a controller 140.

Note that the mobile telephone 100 includes a processor and a memory as hardware, and the functions of the controller 140 are realized by the processor executing programs stored in the memory.

The display 105 is a liquid crystal display (LCD), and has a function of displaying characters, etc. in response to an instruction from the controller 140.

The key set 106 includes the first key set 106a and the second key set 106b shown in FIG. 2A and FIG. 2B, and has a function of outputting a signal corresponding to the key pressed by the user to the controller 140. The key set 106 is used when the user switches between the wireless router function and the other function of the mobile telephone 100, and when the user inputs an off-hook operation in response to an incoming voice call, for example.

The opening/closing detection sensor 107 has a function of detecting the open state and the closed state of the mobile telephone 100. The opening/closing detection sensor 107 is realized with a magnet and a Hall sensor, for example. The magnet is embedded in either a portion of the secondary surface of the first body 101 or a portion of the primary surface of the second body 102. The portions come in contact when the mobile telephone 100 is in the closed state. The Hall sensor is embedded in the other portion than the portion in which the magnet is embedded, and detects the magnetic force of the magnet. When detecting magnetic force, the Hall sensor outputs a predetermined signal indicating the detection to the controller 140. Note that the "secondary surface of the first body 101" refers to the surface of the first body 101 that faces the surface on which the first key set 106a is arranged, and the "primary surface of the second body 102" refers to the surface of the second body 102 on which the second key set 106b is arranged.

The voice processor 108 has: a function of performing D/A conversion on a receiving voice signal received from the second wireless communication unit 120 via the controller 140 to obtain a voice signal, and outputting the voice signal from the receiver 104; and a function of performing A/D conversion on an input audio signal from the microphone 103 to obtain a sending voice signal, and sending the voice signal to the second wireless communication unit 120 via the controller 140.

The first wireless communication unit 110 is a circuit that wirelessly communicates with the external devices (the laptop PC 10A and/or the mobile terminal device 10B), and is realized with, for example, a wireless LAN adaptor complying with the IEEE 802.11 standards.

The second wireless communication unit 120 has a function of performing CDMA wireless communication with the base station 20. The following provides further details of the second wireless communication unit 120.

Figure 4:
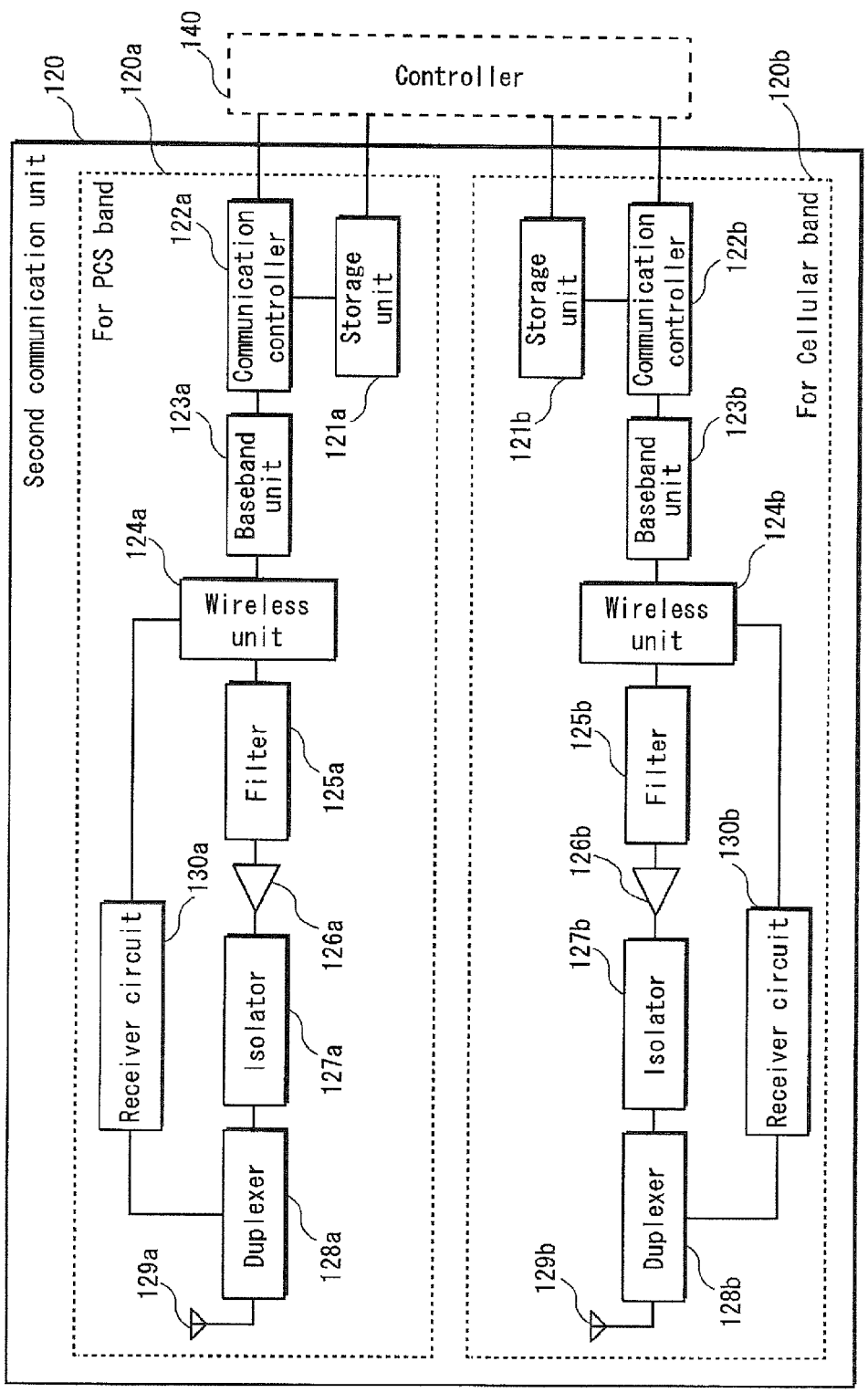
FIG. 4 is a block diagram showing principal functional components of a second wireless communication unit 120 of the mobile telephone 100.

FIG. 4 is a block diagram showing a principal functional components of the second wireless communication unit 120.

As shown in the drawing, the second wireless communication unit 120 includes a PCS-band communicator 120a and a Cellular band communicator 120b.

The PCS-band communicator 120a includes a storage unit 121a, a communication controller 122a, a baseband unit 123a, a wireless unit 124a, a filter 125a, an amplifier 126a, an isolator 127a, a duplexer 128a, an antenna 129a and a receiver circuit 130a.

The Cellular-band communicator 120b includes a storage unit 121b, a communication controller 122b, a baseband unit 123b, a wireless unit 124b, a filter 125b, an amplifier 126b, an isolator 127b, a duplexer 128b, an antenna 129b and a receiver circuit 130b.

Since the PCS-band communicator 120a and the Cellular-band communicator 120b have basically the same structure except for their transmission frequencies, the following only explains the PCS-band communicator 120a.

The storage unit 121a is a memory area for storing information indicating the maximum power for the amplifier 126a at the moment. This information is hereinafter referred to as "maximum power information".

The communication controller 122a has a function of controlling CDMA wireless communication in response to an instruction from the controller 140. In particular, the communication controller 122a instructs the wireless unit 124a and the amplifier 126a to amplify the power within the current limit indicated by the maximum power information stored in the storage unit 121a.

The baseband unit 123a has a function of receiving a baseband signal from the communication controller 122a, digitally modulating the baseband signal, and outputting the signal after the digital modulation to the wireless unit 124a.

The wireless unit 124a has a function of converting the signal received from the baseband unit 123a, which has been subject to the digital modulation, to a wireless signal, and outputting the wireless signal to the amplifier 126a via the filter 125a.

The filter 125a is a band-pass filter interposed between the wireless unit 124a and the amplifier 126a, and passes frequency components within the PCS band corresponding to the amplifier 126a from among the components of the signal received from the wireless unit 124a.

The amplifier 126a is an amplifier for amplifying the power of the PCS-band transmission signal, and has a function of amplifying the signal received via the filter 125a in response to an instruction from the controller 122a.

The isolator 127a is a non-reciprocal circuit device which prevents backflow of the transmission signal.

The duplexer 128a is a device which connects to the antenna 129a, and electrically separates the transmission channel and the reception channel. This device enables simultaneous transmission and reception.

The receiver circuit 130a is a circuit for transmitting a received signal to the wireless unit 124a, and includes, for example, an amplifier for reception (not depicted).

Referring to FIG. 3 again, the following describes the rest of the functional components of the mobile telephone 100. The controller 140 shown in FIG. 3 controls the mobile telephone 100 entirely. In particular, the controller 140 has a function of setting (i.e. updating) the maximum power information stored in the storage unit 121a, and thereby controlling the upper limit of the transmission power when the second wireless communication unit 120 uses the PCS band to transmit a signal.

Note that the following description of Embodiment is based on the assumption that when the mobile telephone 100 is in the open state, the 10 mm condition will not be satisfied if the second wireless communication unit 120 transmits a signal within the PCS band at the first maximum power, and the 10 mm condition will be satisfied if the second wireless communication unit 120 transmits a signal within the Cellular band at the first maximum power.

Hence, the storage unit 121b keeps the same maximum power information indicating the first maximum power, and the controller 140 does not update the maximum power information.

As shown in FIG. 3, the controller 140 includes a mode switcher 141, a communication controller 142, a counter 143 and a transmission power controller 144.

Here, the mode switcher 141 has a function of switching between a mode in which the mobile telephone 100 is enabled to serve as a wireless router (hereinafter referred to as "relay mode"), and a mode in which the wireless router function is disabled, in response to an input signal from the key set 106.

The communication controller 142 has a function of establishing wireless connection with the external devices (10A, 10B) and the base station 20, and exchange data with them via the first wireless communication unit 110 and the second wireless communication unit 120. That is, the communication controller 142 realizes the relaying function by transferring data which has been received from an external device and is addressed to the base station 20 to the base station 20, and transferring data which has been received from the base station 20 and is addressed to an external device to the external device.

Note that in some cases the communication controller 142 relays data between the external devices, namely the laptop PC 10A and the mobile terminal device 10B. The communication controller 142 also establishes wireless connection with an external device according to a regular wireless LAN connection sequence, and disconnects the wireless connection according to a regular wireless LAN disconnection sequence.

The counter 143 has a function of counting the number of external devices currently connected by wireless LAN (hereinafter referred to as "the connection count").

That is, the counter 143 increments the connection count by one when the communication controller 142 makes an Association Response responding to an Association Request from an external device. Also, the counter 143 decrements the connection count by 1 when the communication controller 142 makes a Terminate-Ack responding to a Terminate Request from an external device.

The transmission power controller 144 controls the upper limit of the transmission power of the second wireless communication unit 120 to be the second maximum power (e.g. 21 dBm) or the first maximum power (e.g. 23 dBm) according to whether the current period is the relay period or not and whether the voice communication has been started or not.

4. Operations

Next, operations performed by the mobile telephone 100 having the stated structure will be described with reference to FIG. 5 and FIG. 6.

Figure 5:
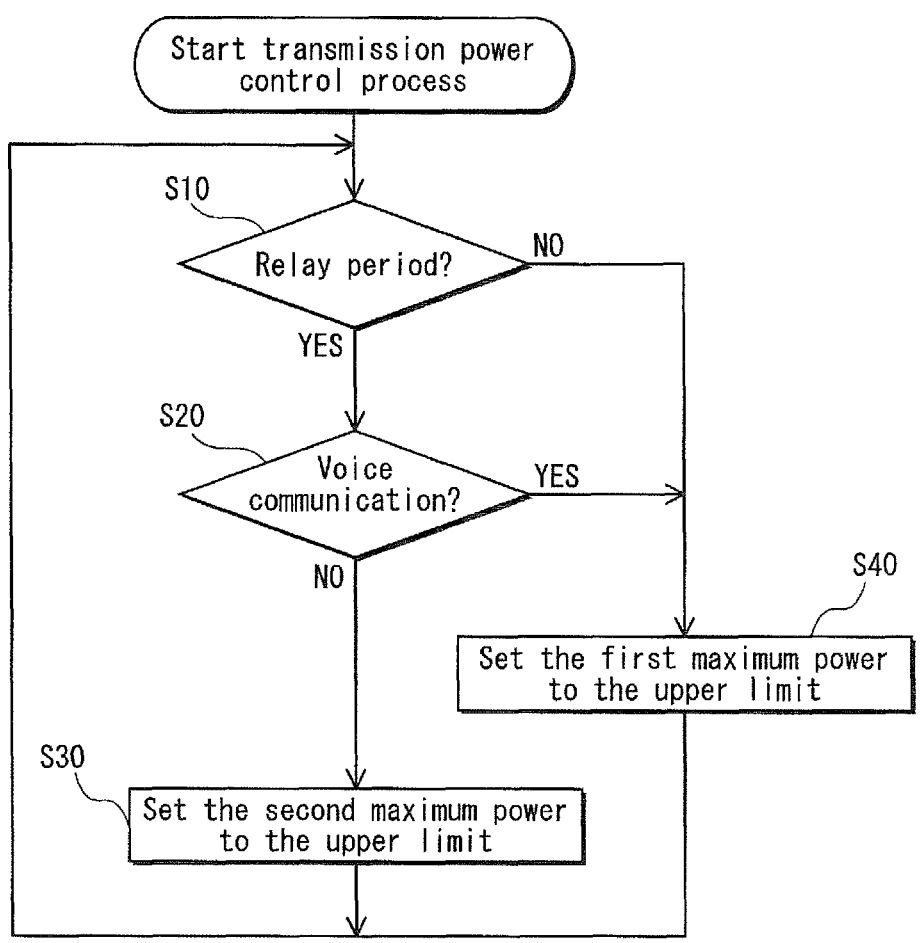
FIG. 5 is a flowchart showing a process for transmission power control performed by the mobile telephone 100.

FIG. 5 is a flowchart showing a process for transmission power control performed by the transmission power controller 144 of the mobile telephone 100.

Note that the process for transmission power control shown in the drawings is started when the mobile telephone 100 is powered on, and, although not particularly depicted in the drawing, is terminated when the mobile telephone 100 is powered off As shown in the drawing, the transmission power controller 144 of the controller 140 first determines whether the current period is the relay period or not (Step S10). How to determine whether the current period is the relay period or not will be described later with reference to FIG. 6.

When determining that the current period is the relay period (Step S10: YES), the transmission power controller 144 determines whether voice communication is performed or not (Step S20). Specifically, the transmission power controller 144 determines that voice communication is started if an off-hook operation is input when the transmission power controller 144 receives a call signal (i.e. ringer) via the second wireless communication unit 120, and determines that voice communication is terminated if an on-hook operation is input after the voice communication has been started. The transmission power controller 144 determines that voice communication is currently performed during a period between when the start of voice communication is detected and when the termination of the voice communication is detected (Step S20: YES).

When determining that voice communication is not performed at Step S20 (Step S20: NO), the transmission power controller 144 sets the maximum power information stored in the storage unit 121a to indicate the second maximum power (Step S30), and restarts the process from Step S10.

When determining that the current period is not the relay period at Step S10 (Step S10: NO) or when determining that voice communication is performed at Step S20 (Step S20: YES), the transmission power controller 144 sets the maximum power information stored in the storage unit 121a to indicate the first maximum power (Step S40), and restarts the process from Step S10.

Next, how to determine whether the current period is the relay period or not at Step S10 will be described in detail.

Figure 6:
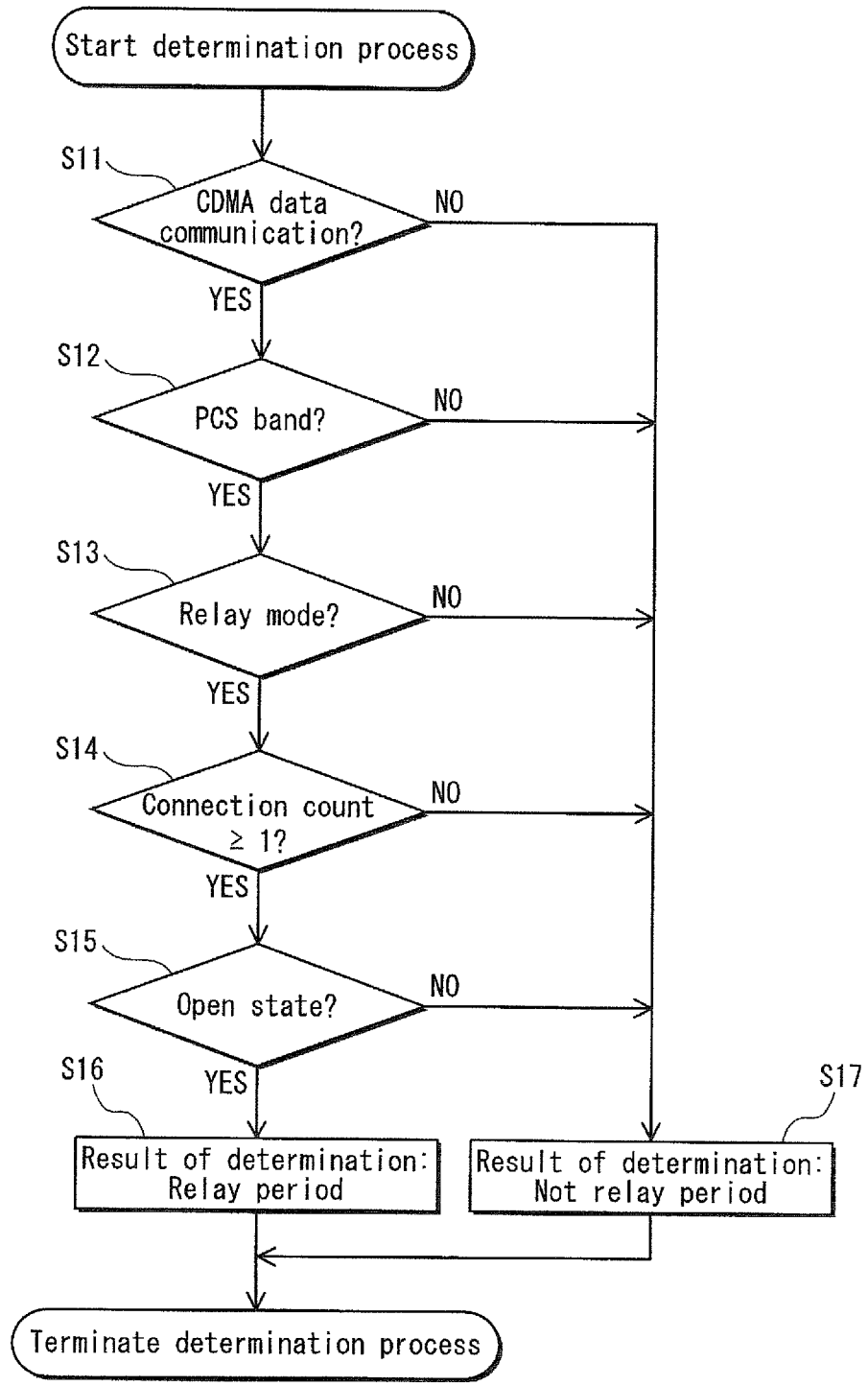
FIG. 6 is a flowchart showing a determination process through which the mobile telephone 100 determines whether the current period is a relay period or not.

FIG. 6 is flowchart showing a determination process through which the transmission power controller 144 of the mobile telephone 100 determines whether the current period is a relay period or not.

First, the transmission power controller 144 determines whether the communication controller 142 performs CDMA data communications, according to whether the data that the communication controller 142 has received from an external device connected thereto is to be transmitted to the base station 20 (Step S11 in FIG. 6).

That is, when the data received by the communication controller 142 is data to be transmitted to the base station 20, the transmission power controller 144 determines that the communication controller 142 performs CDMA data communications (Step S11: YES). When the communication controller 142 has not received data, or when the data received by the communication controller 142 is addressed to another external device (10A or 10B), the transmission power controller 144 determines that the communication controller 142 does not perform CDMA data communications (Step S11: NO).

When determining that the communication controller 142 performs CDMA data communications (Step S11: YES), the transmission power controller 144 determines whether the PCS band is used for the CDMA data communications (Step S12). The determination on whether the PCS band is used or not is performed because, in this description of Embodiment, it is assumed that the 10 mm condition is not satisfied when PCS-band transmission is performed at the first maximum power.

When determining that PCS-band transmission is performed (Step S12: YES), the transmission power controller 144 inquires of the mode switcher 141 whether the current mode is the relay mode or not (Step S13).

This is because data relay does not occur between an external device and the base station when the current mode is not the relay mode.

When determining that the current mode is the relay mode (Step S13: YES), the transmission power controller 144 inquires of the counter 143 whether the current connection count is no less than 1 (Step S14). This is because data relay does not occur between an external device and the base station when the current connection count is 0.

When determining that the current connection count is no less than 1 (Step S14: YES), the transmission power controller 144 determines whether the mobile telephone 100 is currently in the open state or not according to a signal from the opening/closing detection sensor 107 (Step S15).

The determination on whether the mobile telephone 100 is currently in the open state or not is performed because, in this description of Embodiment, it is assumed that the 10 mm condition is not satisfied when PCS-band transmission is performed at the first maximum power under the condition that the mobile telephone 100 is in the open state.

When determining that the mobile telephone 100 is in the open state (Step S15: YES), the transmission power controller 144 determines that the current period is a relay period (Step S16), and finishes the relay period determination.

When determining in the negative at any of the Steps S11-S15 (Step S11: NO, Step S12: NO, Step S13: NO, Step S14: NO, Step S15: NO), the transmission power controller 144 determines that the current period is not the relay period (Step S17), and finishes the relay period determination.

<<Supplemental Descriptions>>

Although a mobile telephone pertaining to the present invention has been described above based on Embodiment, the following modifications may be applied, and the present invention is not limited to the mobile telephone described above as Embodiment, as a matter of course.

(1) According to Embodiment, two external devices, namely the laptop PC 10A and the mobile terminal device 10B, are used as examples of external devices. However, other devices may be used as long as they can wirelessly connect to the mobile telephone 100. Moreover, the number of external devices is not limited to two, and may be any number as long as it is equal to or greater than 1.

According to Embodiment, the mobile telephone 100 performs wireless communication with the external devices (10A and 10B) according to the IEEE 802.11 standards. However, the mobile telephone 100 may perform wireless communication according to other standards. For example, the mobile telephone 100 may perform wireless communication according to the Bluetooth™ standards.

(2) According to Embodiment, the second wireless communication unit 120 of the mobile telephone 100 includes the PCS-band communicator 120a and the Cellular-band communicator 120b. However, the second wireless communication unit 120 may include only the PCS-band communicator 120a. If this is the case, the second wireless communication unit 120 always performs PCS-band communications, and therefore the determination performed at Step S12 shown in FIG. 6 will be unnecessary.

According to Embodiment, the second wireless communication unit 120 performs PCS-band communications and Cellular-band communications. However, these transmission frequency bands are only examples, and another frequency band may be used for data transmission.

According to Embodiment, the second wireless communication unit 120 performs communications according to the CDMA, this is only an example. The second wireless communication unit 120 may use another communication system.

According to Embodiment, it is assumed that the first maximum power is 23 dBm and the second maximum power is 21 dBm. However, the first maximum power and the second maximum power are set to any value as long as they satisfy the 15 mm condition and the 10 mm condition, respectively. It is possible to allow users to set these values. However, in order to minimize the risk of disconnections, it is preferable that the first maximum power is set to be as high as possible within the limit determined by the 15 mm condition, and the second maximum power is set to be as high as possible within the limit determined by the 10 mm condition.

(3) According to Embodiment, it is assumed that the 10 mm condition is not satisfied when the second wireless communication unit 120 performs PCS-band transmission at the first maximum power, and the 10 mm condition is satisfied when the second wireless communication unit 120 performs Cellular-band transmission at the first maximum power. However, this is only an example.

That is, the present invention is also applicable to the cases where the 10 mm condition is satisfied when the second wireless communication unit 120 performs PCS-band transmission at the first maximum power, and the 10 mm condition is not satisfied when the second wireless communication unit 120 performs Cellular-band transmission at the first maximum power. Specifically, modification may be made to Steps S30 and S40 shown in FIG. 5 such that the transmission power controller 144 sets the maximum power information stored in the storage unit 121b, not in the storage unit 121a, and to Step S12 shown in FIG. 6 such that the transmission power controller 144 determines whether the Cellular band is used for the CDMA data communications.

Moreover, the present invention is also applicable to the cases where the 10 mm condition is not satisfied when the PCS-band transmission is performed at the first maximum power or when the Cellular-band transmission is performed at the first maximum power. Specifically, modification may be made to Steps S30 and S40 shown in FIG. 5 such that the transmission power controller 144 sets the maximum power information stored in both storage units (121a and 121b), and to Step S12 shown in FIG. 6 such that the transmission power controller 144 determines whether the PCS band or the Cellular band is used or not for the CDMA data communications.

(4) The second wireless communication unit 120 of the mobile telephone 100 pertaining to Embodiment may be modified such that the second wireless communication unit 120 can switch the transmission frequency bands from the PCS band to the Cellular band during the CDMA data communications with the use of the PCS band.

If such a modification is made, it will be determined at Step S12 in FIG. 6 after the switching that the PCS band is not used for the CDMA data communications (Step S12: NO). Hence, at Step S10 in FIG. 5, the transmission power controller 144 will determines that the current period is not the relay period (Step S10: NO), and will set the maximum power information stored in the storage unit 121a to indicate the first maximum power (Step S40).

That is, even when such a modification is made, it is possible to minimize the risk of disconnections in periods other than the relay period.

(5) All or part of the components described above as for Embodiment may be realized as a one-chip or multiple-chip integrated circuit, or as a computer program, or in any other forms.

The components described above as for Embodiment realize their respective functions by co-operating with the processor included in the mobile telephone.

(6) It is possible that a program for causing the processor to perform the process for transmission power control performed by the mobile telephone 100 (see FIG. 5 and FIG. 6) may be recorded on a recording medium and then distributed, or be distributed via various communication channels or the likes. Examples of such a recording medium include an IC card, a hard disk, an optical disc, a flexible disk, a ROM, and a flash memory. The program thus distributed is stored in, for example, a memory that is readable by the processor, and is then used. The functions of the mobile telephone 100 as Embodiment are realized by the processor executing the program.

(7) All or part of the modifications stated in (1)-(6) above may be applied to the mobile telephone 100 pertaining to Embodiment in combinations.

(8) The following further describes the structure of a mobile telephone pertaining to an embodiment of the present invention, modifications thereof, and advantageous effects thereof.

(a) A mobile telephone pertaining to an embodiment of the present invention is a mobile telephone having a relaying function, the relaying function being a function of wirelessly connecting to an external device and a base station and of relaying data between the external device and the base station, the mobile telephone comprising: a first wireless communication unit configured to perform wireless communication with the external device; a second wireless communication unit configured to perform wireless communication with the base station; and a transmission power controller configured to control transmission power of the second wireless communication unit according to a communication environment within a limit of a first maximum power, wherein the transmission power controller controls the transmission power of the second wireless communication unit within a limit of a second maximum power during a relay period, the relay period being a period in which the mobile telephone relays data between the external device and the base station, the second maximum power being smaller than the first maximum power, and controls the transmission power of the second wireless communication unit within the limit of the first maximum power when voice communication is started in a course of the control using the second maximum power, the first maximum power is defined so that a specific absorption rate (SAR) value measured at a first location is at or below a predetermined limit when the second wireless communication unit transmits data at the first maximum power, and the second maximum power is defined so that a SAR value measured at a second location is at or below the predetermined limit when the second wireless communication unit transmits data at the second maximum power, the second location being closer to the mobile telephone than the first location.

This mobile telephone controls the upper limit of transmission power of the second wireless communication unit to be the second maximum power during the period in which the mobile telephone relays data between the external device and the base station. Hence, with the mobile telephone, the SAR value measured at the location that is closer to the mobile telephone will be at or below the predetermined limit.

When voice communication is started (i.e. in periods other than the period in which the mobile telephone relays data between the external device and the base station), in the course of the control using the second maximum power, the mobile telephone controls the upper limit of transmission power of the second wireless communication unit to be the first maximum power that is greater than the second maximum power. Hence, with the mobile telephone, the risk of disconnections can be minimized in periods other than a period in which the mobile telephone relays data between the external device and the base station.

(b) The second wireless communication unit may perform code division multiple access (CDMA) wireless communication, the mobile telephone may further comprise a mode switcher configured to switch between a relay mode and a non-relay mode in response to a user instruction, the relay mode being a mode in which the relaying function is enabled, and the non-relay mode being a mode in which the relaying function is disabled, the first maximum power may be defined so that the SAR value measured at the first location is at or below the predetermined limit when the second wireless communication unit transmits data at the first maximum power by using a predetermined frequency band for CDMA wireless communication, the second maximum power may be defined so that the SAR value measured at the second location is at or below the predetermined limit when the second wireless communication unit transmits data at the second maximum power by using the predetermined frequency band for CDMA wireless communication, and the relay period may be defined as a period in which the mobile telephone is in the relay mode and in which the second wireless communication unit transmits data by using the predetermined frequency band.

It is assumed that the SAR value will not be at or below the predetermined limit in the case where the SAR value is measured at the location that is closer to the mobile telephone while the mobile telephone is transmitting data at the first maximum power by using the predetermined frequency band. Even in this case, the mobile telephone controls the upper limit of transmission power of the second wireless communication unit to be the second maximum power during the period in which the mobile telephone relays data between the external device and the base station so that the SAR value measured under the condition is at or below the predetermined limit.

Hence, with the mobile telephone, the SAR value measured at the location that is closer to the mobile telephone will be controlled to be at or below the predetermined limit during the period in which the mobile telephone relays data between the external device and the base station.

Moreover, the mobile telephone minimizes the risk of disconnections by avoiding unnecessarily controlling the upper limit of the transmission power of the second wireless communication unit when the mobile telephone is in the non-relay mode and therefore does not relay data between the external device and the base station.

(c) The mobile telephone may be wirelessly connectable to a plurality of external devices simultaneously, the mobile telephone may further comprise a counter configured to count a number of external devices that the mobile telephone is connecting to, and the relay period may be further defined as a period in which the number of external devices counted by the counter is equal to or greater than 1.

The mobile phone minimizes the risk of disconnections by avoiding unnecessarily controlling the upper limit of the transmission power of the second wireless communication unit when the number of external devices that the mobile telephone is connecting to is 0 and therefore the mobile telephone does not relay data between the external device and the base station.

(d) The mobile telephone may include a first body and a second body arrangeable in various positional relationships, the first maximum power may be defined so that the SAR value measured at the first location is at or below the predetermined limit when the first body and the second body are in a predetermined positional relationship and the second wireless communication unit transmits data at the first maximum power by using a predetermined frequency band for CDMA wireless communication, the second maximum power may be defined so that the SAR value measured at the second location is at or below the predetermined limit when the first body and the second body are in the predetermined positional relationship and the second wireless communication unit transmits data at the second maximum power by using the predetermined frequency band for CDMA wireless communication, and the relay period may be further limited to a period in which the first body and the second body are in the predetermined positional relationship.

In the cases of mobile telephones having bodies arrangeable in various positional relationships (e.g. flip mobile telephones and slider mobile telephones), the SAR value generally changes according to the positional relationship of the bodies at the transmission.

It is assumed that the SAR value will not be at or below the predetermined limit in the case where the SAR value is measured at the location that is closer to such a mobile telephone when the bodies are in the predetermined position. Even in this case, the mobile telephone controls the upper limit of transmission power of the second wireless communication unit to be the second maximum power during the period in which the mobile telephone relays data between the external device and the base station.

Hence, with the mobile telephone, the SAR value measured at the location that is closer to the mobile telephone will be controlled to be at or below the predetermined limit during the period in which the mobile telephone relays data between the external device and the base station.

(9) The first wireless communication unit and the second wireless communication unit of the mobile telephone pertaining to the present invention respectively correspond to, for example, the first wireless communication unit 110 and the second wireless communication unit 120 of the mobile telephone 100 pertaining to Embodiment. The transmission power controller, the mode switcher and the counter of the mobile telephone pertaining to the present invention respectively correspond to, for example, the transmission power controller 144, the mode switcher 141 and the counter 143 of the mobile telephone 100 pertaining to Embodiment.

The external device that the mobile telephone pertaining to the present invention wirelessly connects to corresponds to, for example, the laptop PC 10A or the mobile terminal device 10B that the mobile telephone 100 pertaining to Embodiment wirelessly connects to. The base station that the mobile telephone pertaining to the present invention wirelessly connects to corresponds to, for example, the base station 20 that the mobile telephone 100 pertaining to Embodiment wirelessly connects to.

INDUSTRIAL APPLICABILITY

The present invention relates to a mobile telephone having a function of relaying data between an external device and a base station, and is used for controlling transmission power.

REFERENCE SIGNS LIST

100: mobile telephone
101: first body
102: second body
103: microphone
104: receiver
105: display
106: key set
107: opening/closing detection sensor
108: voice processor
110: first wireless communication unit
120: second wireless communication unit
140: controller
141: mode switcher
142: communication controller
143: counter
144: transmission power controller

What is claimed is:

1. A mobile telephone having a relaying function, the relaying function being a function of wirelessly connecting to an external device and a base station and of relaying data between the external device and the base station, the mobile telephone comprising:
  a first wireless communication unit configured to perform wireless communication with the external device;
  a second wireless communication unit configured to perform wireless communication with the base station; and
  a transmission power controller configured to control transmission power of the second wireless communication unit according to a communication environment within a limit of a first maximum power, wherein
  the transmission power controller
    controls the transmission power of the second wireless communication unit within a limit of a second maximum power during a relay period, the relay period being a period in which the mobile telephone relays data between the external device and the base station, the second maximum power being smaller than the first maximum power, and
    controls the transmission power of the second wireless communication unit within the limit of the first maximum power when voice communication is started in a course of the control using the second maximum power,
  the first maximum power is defined so that a specific absorption rate (SAR) value measured at a first location is at or below a predetermined limit when the second wireless communication unit transmits data at the first maximum power, and
  the second maximum power is defined so that a SAR value measured at a second location is at or below the predetermined limit when the second wireless communication unit transmits data at the second maximum power, the second location being closer to the mobile telephone than the first location.

2. The mobile telephone of claim 1, wherein
the second wireless communication unit performs code division multiple access (CDMA) wireless communication,
the mobile telephone further comprises a mode switcher configured to switch between a relay mode and a non-relay mode in response to a user instruction, the relay mode being a mode in which the relaying function is enabled, and the non-relay mode being a mode in which the relaying function is disabled,
the first maximum power is defined so that the SAR value measured at the first location is at or below the predetermined limit when the second wireless communication unit transmits data at the first maximum power by using a predetermined frequency band for CDMA wireless communication,
the second maximum power is defined so that the SAR value measured at the second location is at or below the predetermined limit when the second wireless communication unit transmits data at the second maximum power by using the predetermined frequency band for CDMA wireless communication, and
the relay period is defined as a period in which the mobile telephone is in the relay mode and in which the second wireless communication unit transmits data by using the predetermined frequency band.

3. The mobile telephone of claim 2, wherein
the mobile telephone is wirelessly connectable to a plurality of external devices simultaneously,
the mobile telephone further comprises a counter configured to count a number of external devices that the mobile telephone is connecting to, and the relay period is further defined as a period in which the number of external devices counted by the counter is equal to or greater than 1.

4. The mobile telephone of claim 2, wherein the mobile telephone includes a first body and a second body arrangeable in various positional relationships, the first maximum power is defined so that the SAR value measured at the first location is at or below the predetermined limit when the first body and the second body are in a predetermined positional relationship and the second wireless communication unit transmits data at the first maximum power by using a predetermined frequency band for CDMA wireless communication, the second maximum power is defined so that the SAR value measured at the second location is at or below the predetermined limit when the first body and the second body are in the predetermined positional relationship and the second wireless communication unit transmits data at the second maximum power by using the predetermined frequency band for CDMA wireless communication, and the relay period is further defined as a period in which the first body and the second body are in the predetermined positional relationship.

5. A method for controlling transmission power of a mobile telephone having a relaying function and including a first communication unit and a second communication unit, the relaying function being a function of wirelessly connecting to an external device and a base station and of relaying data between the external device and the base station, the first communication unit being configured to perform wireless communication with the external device, the second communication unit being configured to perform wireless communication with the base station, the method comprising:

a control step of controlling transmission power of the second wireless communication unit according to a communication environment within a limit of a first maximum power, wherein in the control step, the transmission power of the second wireless communication unit is controlled within a limit of a second maximum power during a relay period, the relay period being a period for relaying data between the external device and the base station, the second maximum power being smaller than the first maximum power, and the transmission power of the second wireless communication unit is controlled within the limit of the first maximum power when voice communication is started in a course of the control using the second maximum power, the first maximum power is defined so that a specific absorption rate (SAR) value measured at a first location is at or below a predetermined limit when the second wireless communication unit transmits data at the first maximum power, and the second maximum power is defined so that a SAR value measured at a second location is at or below the predetermined limit when the second wireless communication unit transmits data at the second maximum power, the second location being closer to the mobile telephone than the first location.

6. A non-transitory computer-readable recording medium having recorded thereon a computer program for causing a processor of a mobile telephone to perform a process for controlling transmission power of the mobile telephone, the mobile telephone having a relaying function and including a first communication unit and a second communication unit, the relaying function being a function of wirelessly connecting to an external device and a base station and of relaying data between the external device and the base station, the first communication unit being configured to perform wireless communication with the external device, the second communication unit being configured to perform wireless communication with the base station, the process comprising:

a control step of controlling transmission power of the second wireless communication unit according to a communication environment within a limit of a first maximum power, wherein in the control step, the transmission power of the second wireless communication unit is controlled within a limit of a second maximum power during a relay period, the relay period being a period for relaying data between the external device and the base station, the second maximum power being smaller than the first maximum power, and the transmission power of the second wireless communication unit is controlled within the limit of the first maximum power when voice communication is started in a course of the control using the second maximum power, the first maximum power is defined so that a specific absorption rate (SAR) value measured at a first location is at or below a predetermined limit when the second wireless communication unit transmits data at the first maximum power, and the second maximum power is defined so that a SAR value measured at a second location is at or below the predetermined limit when the second wireless communication unit transmits data at the second maximum power, the second location being closer to the mobile telephone than the first location.

* * * * *